US011158988B2

(12) United States Patent
Moles et al.

(10) Patent No.: US 11,158,988 B2
(45) Date of Patent: Oct. 26, 2021

(54) BRUSH ASSEMBLY

(71) Applicant: Ratier-Figeac SAS, Figeac (FR)

(72) Inventors: Patrick Moles, Corn (FR);
Jean-Christophe Labascoule, Faycelles (FR); Gilbert Henry, Figeac (FR)

(73) Assignee: RATIER-FIGEAC SAS, Figeac (FR)

( * ) Notice: Subject to any disclaimer, the term of this patent is extended or adjusted under 35 U.S.C. 154(b) by 5 days.

(21) Appl. No.: 16/715,401

(22) Filed: Dec. 16, 2019

(65) Prior Publication Data
US 2021/0013688 A1   Jan. 14, 2021

(30) Foreign Application Priority Data

Jul. 12, 2019  (EP) ..................................... 19305933

(51) Int. Cl.
*H02K 13/10* (2006.01)
*H01R 39/38* (2006.01)
*H01R 39/08* (2006.01)
*H01R 39/40* (2006.01)
*H01R 39/415* (2006.01)
*H01R 39/58* (2006.01)
*H02K 5/14* (2006.01)

(52) U.S. Cl.
CPC ........... *H01R 39/385* (2013.01); *H01R 39/08* (2013.01); *H01R 39/40* (2013.01); *H01R 39/415* (2013.01); *H01R 39/58* (2013.01); *H02K 5/148* (2013.01)

(58) Field of Classification Search
CPC ........ H02K 5/148; H02K 13/10; H02K 23/18; H01R 39/381; H01R 39/385
See application file for complete search history.

(56) References Cited

U.S. PATENT DOCUMENTS

| 2,358,958 | A | * | 9/1944 | Brown | ................... | H01R 39/36 |
| | | | | | | 310/249 |
| 3,523,288 | A | * | 8/1970 | Thompson | ........... | G01R 31/343 |
| | | | | | | 340/648 |
| 3,784,856 | A | | 1/1974 | Preston | | |
| 5,767,605 | A | | 6/1998 | Giamati | | |
| 7,615,908 | B2 | * | 11/2009 | Yamamuro | .............. | H02K 9/28 |
| | | | | | | 310/228 |
| 2005/0156477 | A1 | | 7/2005 | Bocka et al. | | |
| 2015/0357779 | A1 | | 12/2015 | Steinbach | | |

FOREIGN PATENT DOCUMENTS

GB    2061922 A    5/1981

OTHER PUBLICATIONS

Extended European Search Report for International Application No. 19305933.4 dated Nov. 14, 2019, 11 pages.

* cited by examiner

*Primary Examiner* — Dang D Le
(74) *Attorney, Agent, or Firm* — Cantor Colburn LLP (57) ABSTRACT

A brush assembly for transmitting electrical power to a rotating component includes one or more electrically conductive brushes, a housing configured to receive the one or more brushes and hold the one or more brushes in alignment with an opposing surface, and one or more brush carriers. Each carrier is configured to receive and clip onto a respective brush such that each of the one or more brushes can be removed from its respective carrier by unclipping the carrier from the brush.

18 Claims, 12 Drawing Sheets

BRUSH ASSEMBLY

FOREIGN PRIORITY

This application claims priority to European Patent Application No. 19305933.4 filed Jul. 12, 2019, the entire contents of which is incorporated herein by reference.

FIELD

The present disclosure relates generally to a brush assembly (which may otherwise be referred to as a brush block assembly). In various embodiments the brush assembly may be for conducting electrical power from a fixed or nonrotating power system to a rotating system, such as a propeller. The technology described herein may be particularly useful when used in connection with an aircraft propeller ice protection system. Various embodiments may relate to aircraft propeller deicing systems comprising the brush assembly. The application is, however, not limited to this function, and is also applicable to gas turbine engine health monitoring systems, or any other system that requires power transfer from a fixed system to a rotating system. For example, the technology described herein is applicable to any application involving a brush assembly that transfers electrical power between a rotating system and a fixed system.

BACKGROUND

Transmission of electrical power between a nonrotating power system and a rotating system is typically performed through a brush assembly including brushes that form part of the nonrotating system, which are configured to ride on slip rings located on the rotating system. Thus, the brushes and slip rings form a plurality of sliding contacts. Electrical power may be conducted from the brushes of the fixed brush assembly through the plurality of sliding contacts, and to the rotating slip rings of a slip ring assembly.

Due to the continuous sliding contact with the rotating slip ring the brushes wear during use. For this reason they are required to be replaced periodically. In conventional systems brush replacement may require a complete disassembly and then reassembly of the brush block, including electrical disconnection operations.

It is desired to improve the brush assembly so that the brushes experience less wear during use, and also so that a user can more easily handle the brushes, for example in a safe and efficient manner.

SUMMARY

In an aspect there is provided a brush assembly for transmitting electrical power to a rotating component, the assembly comprising: one or more electrically conductive brushes; a housing configured to receive the one or more brushes and hold the one or more brushes in alignment with an opposing surface; one or more brush carriers, each configured to receive and clip onto a respective brush such that each of the one or more brushes can be removed from its respective carrier by unclipping the carrier from the brush.

The brush assembly may further comprise one or more resilient members (e.g., a spring such as a coil spring) configured to bias a respective carrier towards an opposing surface.

The resilient member may be biased between the housing and a respective carrier.

The brushes may be replaceable and/or removable from the carrier, for example without any disassembly or damage being caused to the remainder of the assembly.

Each brush carrier may be configured to slide within the housing.

Each brush carrier may be configured to prevent contact between the housing and a respective brush.

The brushes and/or the carrier may comprise one or more retaining devices configured to hold the brushes in place with respect to the carrier.

One of the carriers and brushes may comprise one or more projections, and the other of the carriers and brushes may comprise one or more recesses, wherein the projections and recesses may be paired with each other such that as the carrier clips onto the brush, each projection mates with a respective recess to substantially prevent movement of each brush relative to a respective carrier.

The recesses may be located on the brushes and machined into lateral sides thereof.

The projections may be located on the carrier and formed in arms of the carrier that clip onto lateral sides of the brushes.

Each of the one or more brushes may comprise upper and lower surfaces for electrical contact with an opposing conductor. The recesses or projections may be located a distance along the length of the brushes or carriers between the upper and lower contact surfaces. One of the upper or lower contact surfaces could be used as a first contact surface, then the brush inverted after a period of operation and the other of the upper or lower contact surfaces used as a second, different contact surface. Locating the recesses or projections along the length of the brushes or carriers may facilitate this, by providing an obvious stage for inverting the brushes in use due to the upper or lower contact surface wearing down in use to (or near to) the recess or projection.

The brush assembly may further comprise a locking member configured to prevent movement of the carrier.

The locking member may be movable between a first position in which the locking member prevents movement of the carrier in a direction towards or away from an opposing surface, and a second position in which the locking member does not prevent movement of the carrier towards or away from an opposing surface.

The brush assembly may further comprise an indication device configured to indicate a maximum travel of the carrier, so as to indicate a maximum wear of the brush.

The brush assembly may further comprise one or more seals between the carrier and the housing, wherein the one or more seals are configured to prevent particulates from entering an interior of the housing in use.

BRIEF DESCRIPTION OF THE DRAWINGS

Various embodiments will now be described, by way of example only, and with reference to the accompanying drawings in which:

FIG. 3 shows an embodiment of the disclosure in which part of the brush assembly is modified so as to improve the ability of the brushes to avoid wear, wherein FIG. 3 represents a cross section "A" through the brush assembly as shown in FIG. 3A;

FIG. 8A shows the brush assembly with a locking member displaced, while

DETAILED DESCRIPTION

Figure 1A:
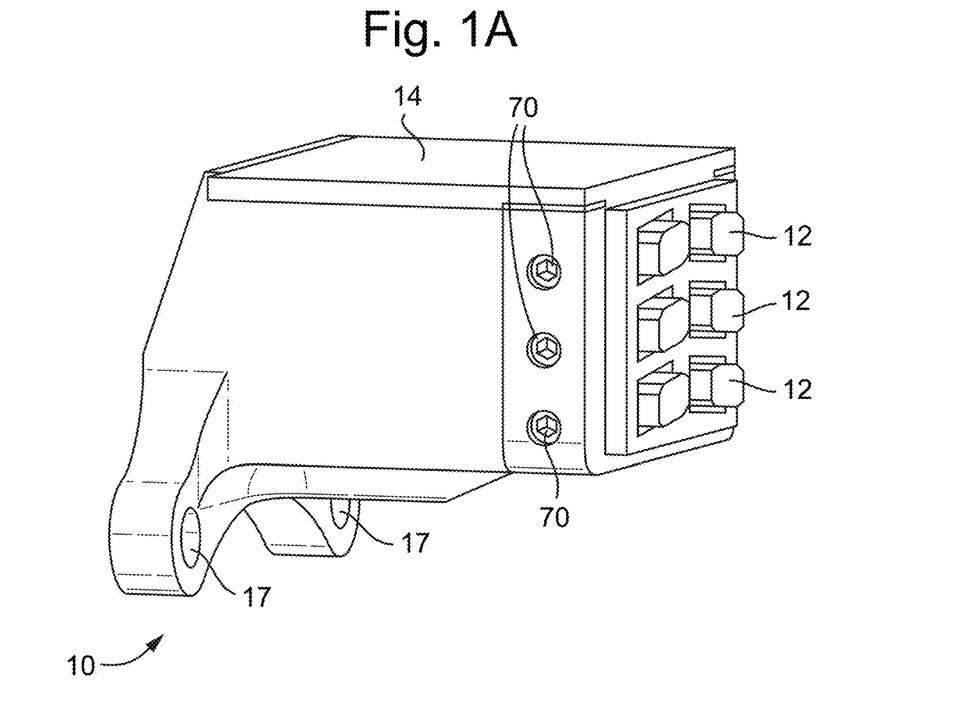
FIGS. 1A, 1B and 1C show a brush assembly (which could be referred to as a brush block assembly) comprising one or more electrically conductive brushes.
Figure 1B:
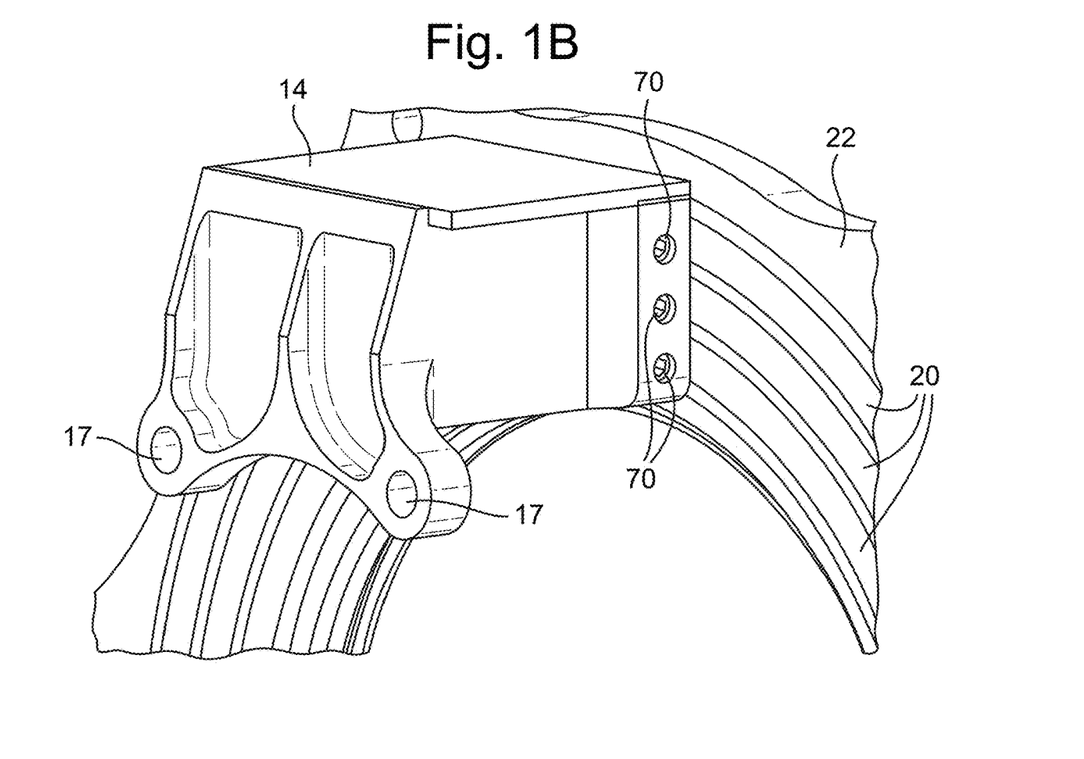
Figure 1C:
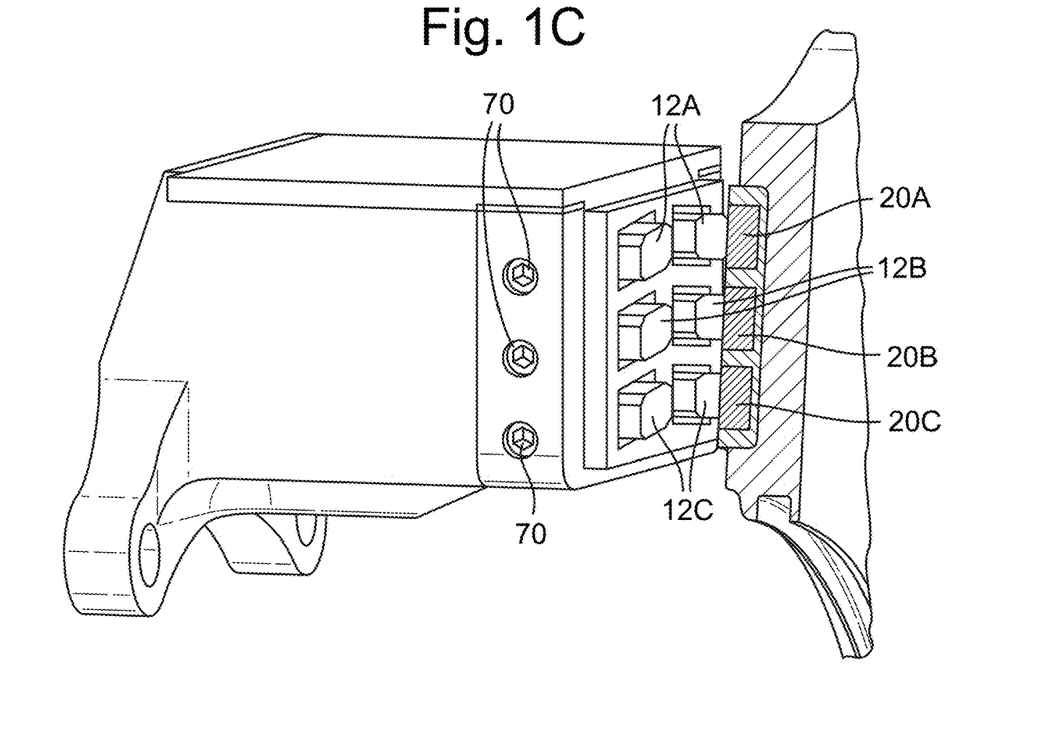

FIGS. 1A, 1B and 1C shows a brush assembly 10 (which could be referred to as a brush block assembly), in which one or more electrically conductive brushes 12 are provided, which are mountable within the assembly 10 and may each be configured to contact a conductive slip ring 20 located on a ring member 22 of an opposing rotating system. In various embodiments the brush(es) 12 could be located on the rotating system, and the slip ring(s) 20 and ring member 22 could be located on the fixed system. For brevity the alternative will not be described in more detail, suffice to say that the features described below could all be applied to this alternative. The brushes 12 may be made from carbon. Any alternative material can be covered by the following.

The brush assembly 10 may further comprise a mounting device 14 for mounting the assembly 10 to a fixed, nonrotating system, which could be any suitable mounting device known in the art. The mounting device 14 could be mounted using fasteners that extend through respective apertures 17 on the mounting device, although any suitable connection may be used. For example, the mounting device 14 could form an integral part of a larger assembly or device of the fixed system.

The assembly 10 further comprises one or more electrical connectors 16 (see FIG. 3) configured to transmit electrical power from a power source of a fixed power system to the brushes 12. The assembly 10 may further comprise additional mounting devices configured to hold and to guide the brushes 12 in place within the assembly 10. Any suitable mounting devices or components for electrically connecting the brushes to a power system may be used.

The brushes 12 may be spring-loaded, in that the assembly 10 comprises one or more resilient members 40 for urging each of the one or more brushes 12 against the slip ring 20. The brushes 12 are shown with a substantially rectangular cross-section having (optional) bevelled edges, but any other cross-sectional shape may be used, such as circular. When assembled, the brushes 12 will be in suitable alignment with the slip ring 20 as shown in FIGS. 1A and 1B, and may remain so during use.

The slip rings 20 may form part of a propeller assembly comprising the ring member 22, which itself may be attached to an aircraft engine or aircraft. In various embodiments the power conducted through the brushes 12 and slip rings 20 may be used in an ice protection system for the propeller assembly, for example a power supply of such a system. As discussed above the brush assembly 10 and the slip rings 20 may be swapped, so that the brush assembly 10 could be located on the rotating system, and the slip rings 20 could be located on the fixed system.

FIG. 1C shows the alignment of the brushes 12 and slip rings 20. In this embodiment it can be seen that a first row of brushes 12A are aligned with and configured to contact a first slip ring 20A, whilst a second row of brushes 12B are aligned with and configured to contact a second slip ring 20A, and a third row of brushes 12C are aligned with and configured to contact a third slip ring 20A. Any number of rows may be provided, as well as any number of brushes 12 within each row. In any of these configurations there is typically one slip ring 20 provided for each row of brushes 12.

Ice protection systems may be used to prevent ice build-up on an aircraft's propeller blades. The slip rings 20 may be electrically connected to a resistive heating element in the form of a flexible strip that is disposed along a section of the propeller blade's leading edge, for example close to a hub of the propeller blades. The application of electrical current to the resistive heating element (via the electrical connector 16, brushes 12 and slip rings 20) can weaken the bond between ice and the surface of the blade, which causes ice to be displaced by the centrifugal forces generated during rotation of the propellers.

The power source may be located on a nonrotating portion of the aircraft. The power source may be configured to provide electrical current to the brushes 12, which as discussed above are in electrical contact with the conductive slip rings 20 mounted to the rotating system. The slip ring may be located at the rear of the propeller assembly or on a shaft of the propeller. The power source may be configured to provide at least 0.5, 1 or 2 kV per propeller blade in order to provide the deicing function described herein.

Due to the nature of aircraft maintenance, the technology disclosed herein is particularly applicable to brush assemblies that are used in connection with propeller systems, and especially propeller deicing systems. However, as will be appreciated the advantages of the brush assemblies disclosed herein relate to regular replacement of brush and this can be applied to any type of system. In other words, the broadest aspects of the present disclosure are not limited to aircraft, or aircraft maintenance.

Figure 2:
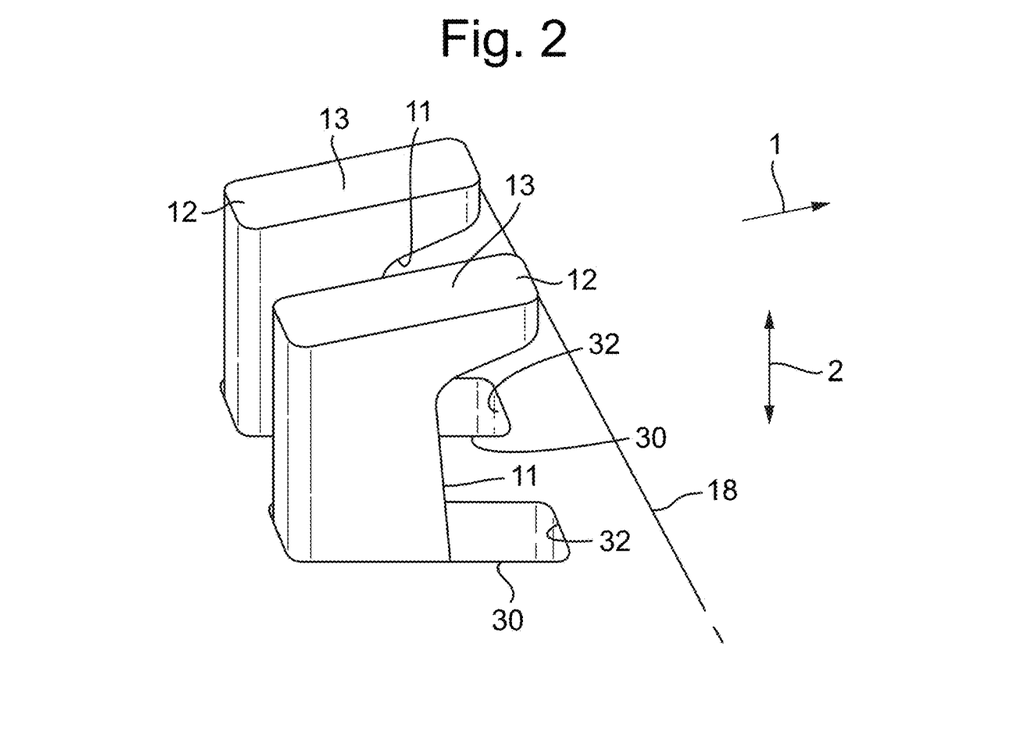
FIG. 2 shows schematically a set of conventional brushes 12 in isolation and removed from their respective slip rings.

FIG. 2 shows schematically a set of conventional brushes 12 in isolation and removed from their respective slip rings, to illustrate the wear that can occur during operation in conventional arrangements.

The brushes 12 are retained within a housing indicated at 18, which comprises apertures 30 through which each of the brushes 12 extend. In use a contact face 13 of each brush 12 slides along an opposing slip ring 20, which rotates in a rotational direction as indicated by the arrow 1. As discussed above the brushes 12 are typically spring-loaded in a axial direction, as indicated by arrow 2.

Due to the continuous movement of the brushes 12 in use, and the direction of rotation of the slip ring 20, a rear face 11 of the brushes 12 continually rubs against an opposing face 32 of the housing 18. As is indicated in FIG. 2, this causes the rear face 11 of each brush 12 to wear away and create an undercut in each brush 12.

Figure 3:
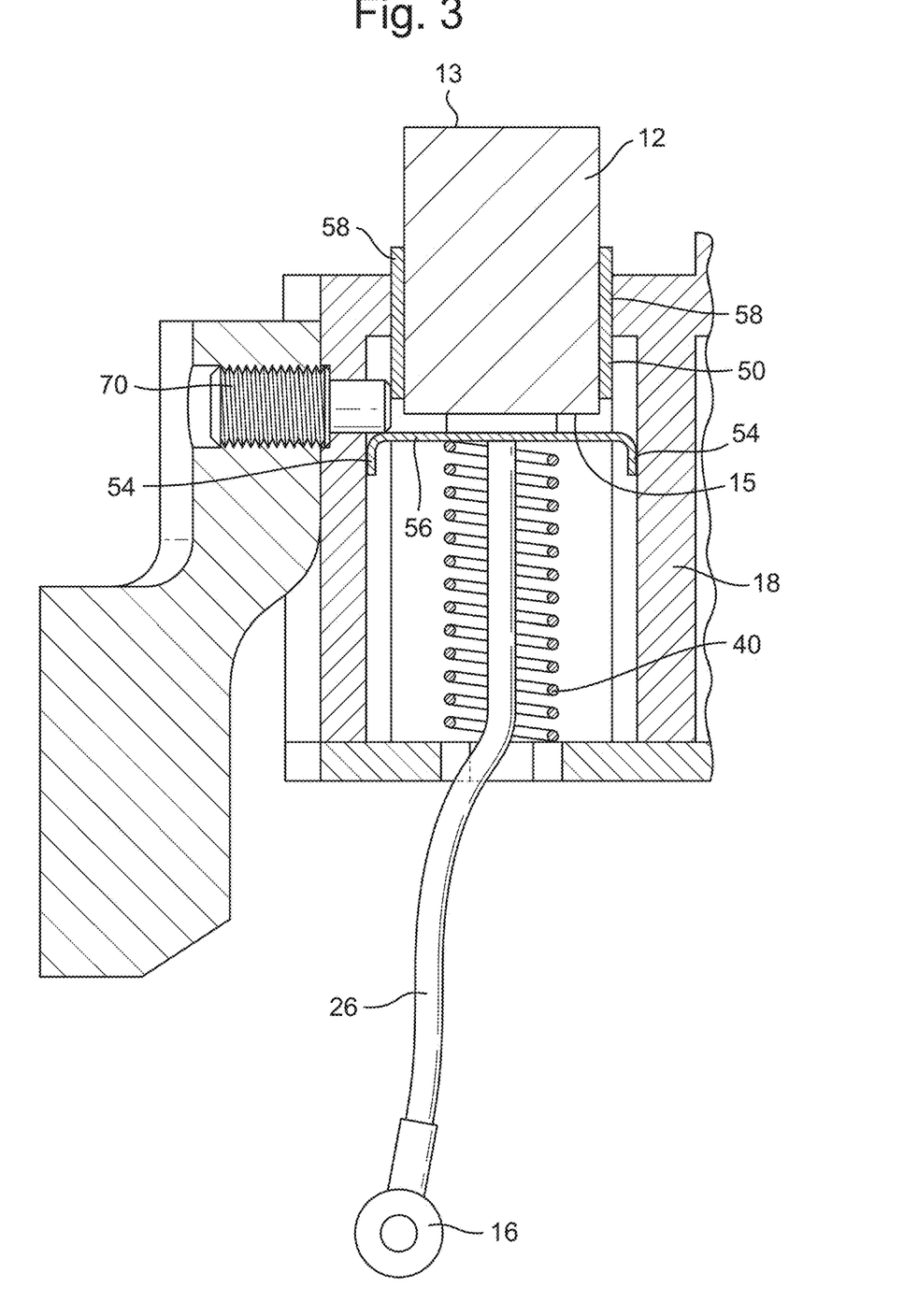
Figure 3A:
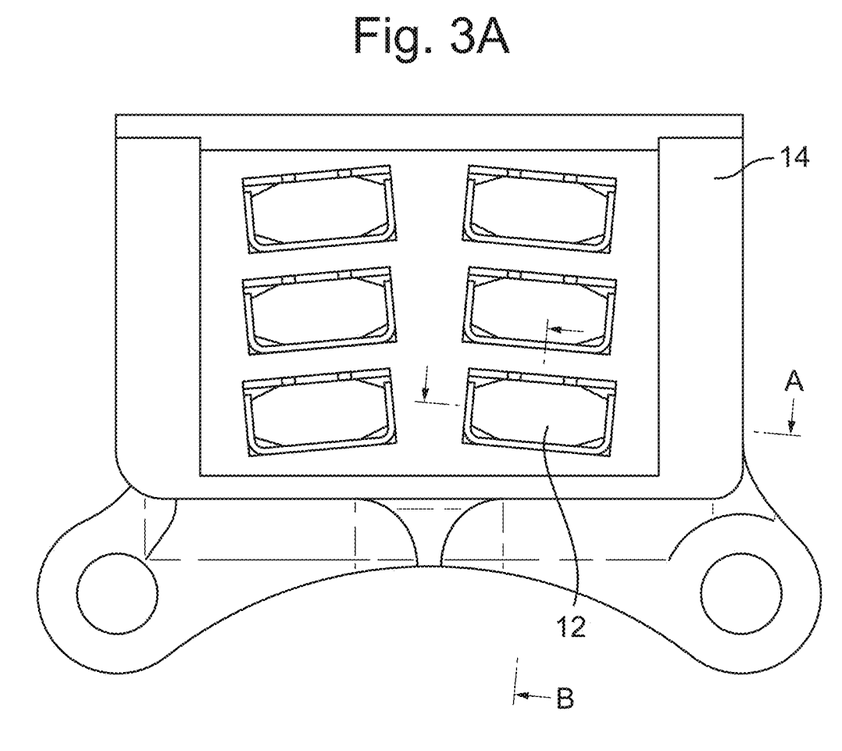

FIG. 3 shows an embodiment of the disclosure in which part of the brush assembly 10 is modified so as to improve the ability of the brushes to avoid wear (thus extending the life) and also provide a mechanism for simple replacement of the brushes without substantially affecting the rest of the assembly. FIG. 3 represents a cross section "A" through the brush assembly 10 as shown in FIG. 3A.

The brush assembly 10 comprises a housing 18 as well as one or more brushes 12 as described above. The brushes 12 may each be spring-loaded through the use of one or more resilient members 40, for example a spring, wherein each brush 12 may be associated with a respective resilient member 40. Each resilient member 40 may be configured to bias a respective brush 12 towards an opposing rotating member, for example the slip ring 20.

One or more conductors 26 (e.g., electrical wire(s)) may be provided that are each connected to the electrical connector 16, which conductor(s) 26 may be for providing an electrical connection between the electrical connector 16 and the brushes 12.

In accordance with the disclosure, each of the one or more brushes 12 are retained within a carrier 50 that is configured to hold and clip onto a respective brush 12. The carrier(s) 50 also provide the electrical continuity with the brushes 12. Each carrier 50 may be biased by a respective resilient member 40, such that the resilient member 40 urges the carrier 50 and, in turn, the brush 12 in a direction towards an opposing rotating member, such as the slip ring 20.

Each of the one or more brushes 12 may be removable from its respective carrier 50 separately from the brush assembly 10 and/or the remainder of the brushes 12. This means that the one or more brushes 12 can be removed from the assembly 10 without substantially affecting the remainder of the assembly 10, for example disassembling other parts of the assembly 10. In addition, the one or more brushes 12 can be removed without interfering with the electrical connections of the assembly 10.

The brush assembly 10 may further comprise one or more seals between the carrier 50 and the housing 18, or the carrier 50 may be substantially sealed against the housing 18 to prevent particulates from entering an interior of the housing 18 in use.

Figure 4A:
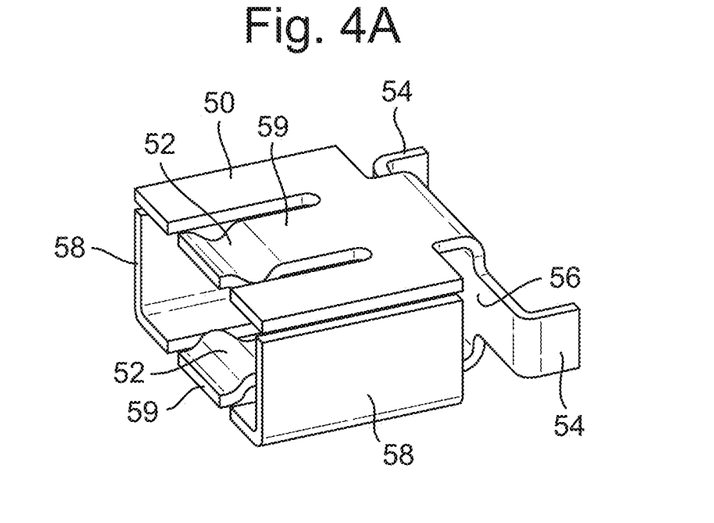
FIGS. 4A, 4B and 4C show various parts of the brush assembly in isolation.

Referring now to FIG. 4A, each of the one or more carriers 50 may have a base 56 and one or more arms 58, 59 extending from the base 56. The base 56 and arms 58, 59 may form a box shape, which is configured to receive the brush 12. Each brush 12 may fit within the arms 58, 59 of a respective carrier 50, and rest overlying the base 56 with optionally a small gap between a lower surface 15 (FIG. 3) of the brush 12 and the base 56. The arms 58, 59 of the carrier 50 may be located between the housing 18 and a respective brush 12, so as to prevent contact between the brush 12 and the housing 18. This reduces wear of the brush 12.

Alternative configurations may exist with a retaining element implemented on arms 58 (instead of arms 59) or on both 58 and 59 arms. For brevity only the configuration with clip installed on arm 59 is illustrated. However, a person of skill in the art could envisage the other configurations described, as well as other variants that would suit a particular application.

The brushes 12 may be clipped into the carrier 50, in that the arms 58, 59 of each carrier 50 may clipped onto a respective brush 12. Additionally, or alternatively the brushes 12 may be held within the carrier 50 by a suitable engineering fit, for example an interference fit, friction fit, force fit, driving fit or press fit. In various embodiments the brushes 12 may be held within the carrier 50 by a shrink fit. In each of these situations the brushes 12 should be removable separately from the remainder of the assembly 10 as discussed above.

Figure 4B:
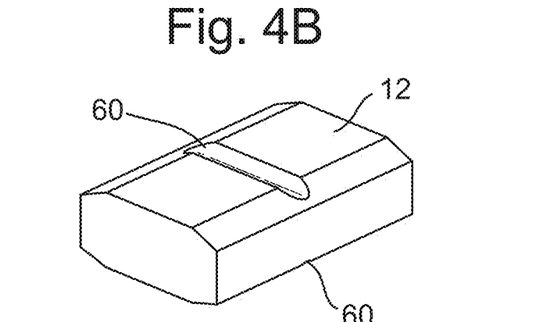

As shown in FIG. 4B, which shows a brush 12 in isolation, in order to hold the brushes 12 in place, the brushes 12 may comprise one or more recesses 60 (as shown in, e.g., FIG. 3) that are each configured to mate with a corresponding projection 52 located on the carrier 50 (e.g., the arms 59 thereof, which may be displaceable tines). The recess(es) 60 can be either directly machined in the brush material or be provided by a metallic insert integrated to the brush during the manufacturing process. When the projections 52 mate with a respective recess 60, movement of the brush 12 relative to the carrier 50 may be substantially prevented.

In various embodiments the projections 52 and recesses 60 could be located on the other component, for example the brushes 12 could comprise projections and the carrier 50 could comprise recesses.

Generally, the brushes 12 and/or carrier 50 may comprise one or more retaining devices configured to hold the brushes 12 in place with respect to the carrier 50. In the illustrated embodiment the retaining device corresponds to the cooperating projections 52 and recesses 60, although other types of retaining device could be envisaged by the skilled person (e.g., as discussed above, a suitable engineering fit or other type of cooperating elements).

The projections 52 may be located on the arms or tines 59 of the carrier 50, and the recesses 60 may be located on lateral sides of the brush 12, such that they do not form part of the contact surface 13 thereof. The arms 59 may be displaced or deformed to allow the brush 12 to be inserted into the carrier 50. The projections 52 may then be aligned with their recesses 60, and then the arms 59 displaced or allowed to rest, such that the projections 59 mate with a respective recess 60. Each of the one or more carriers 50 will then be clipped onto a respective brush 12.

Figure 4C:
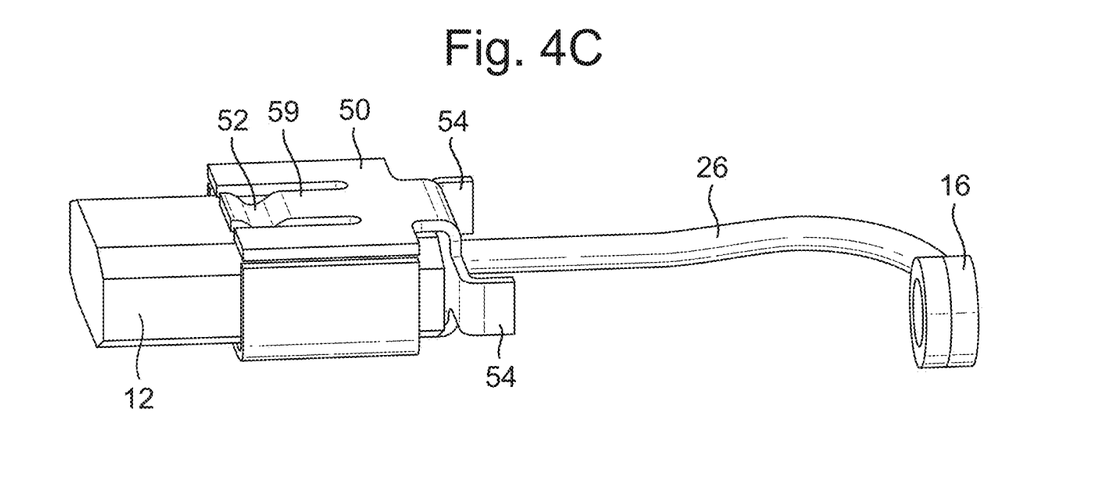

FIG. 4C shows a brush 12 mated with a respective carrier 50, such that the projections 52 are mated with corresponding recesses 60 such that the brush 12 is fixed in place with respect to the carrier 50. This can also be seen in FIG. 5, which is a cross-section "B" through the brush assembly 10 as shown in FIG. 3A.

The carrier 50 may be made from an electrically conductive material, such as metal, so that the conductor 26 can be mounted directly to the carrier 50 and provide an electrical connection to the brush 12 via the carrier 50. An alternative could be that the carrier is including a mean (or an electrical connection) to enable electrical current to be transmitted to the brush.

Referring back to FIG. 3, the carrier 50 may comprise one or more flanges 54 configured to abut a portion of the housing 18 and/or (as shown in the illustrated embodiment) a locking member 70 (e.g., a pin or screw or any other suitable locking device). The purpose of this is to prevent the carrier 50 from contacting an opposing slip ring 20 as the brush 12 wears down in use, and to prevent movement of the arms or tines 59 outward. This prevents the brush 12 from being removed from the carrier 50 as discussed in more detail below.

If a locking member 70 is provided, it may be removable from the housing 18 to permit insertion or other manipulation of the carrier 50. When in the locking position, as shown in FIG. 3, the locking member 70 may be substantially fixed against movement in a direction towards an opposing rotating member, e.g., the slip ring 20. As such, the carrier 50 can be prevented from contacting the opposing rotating member since it cannot move past the locking member 70 due to the contact between the locking member 70 and the flange(s) 54 of the carrier 50.

It should be noted that the locking member 70 can be used to detect contact with the flange 54 of the carrier 50, for example to indicate when the brush 12 is fully worn. This contact can be achieved by the closing of an electrical circuit between the connector 16 (e.g., via conductor 26) and locking member 70. As shown in FIG. 1A the locking member 70 can be accessed from the exterior of the mounting device 14, which could aid this functionality. In this manner the locking member 70 may act as an indication device configured to indicate a maximum travel of the carrier, so as to indicate a maximum wear of the brush.

Figure 6:
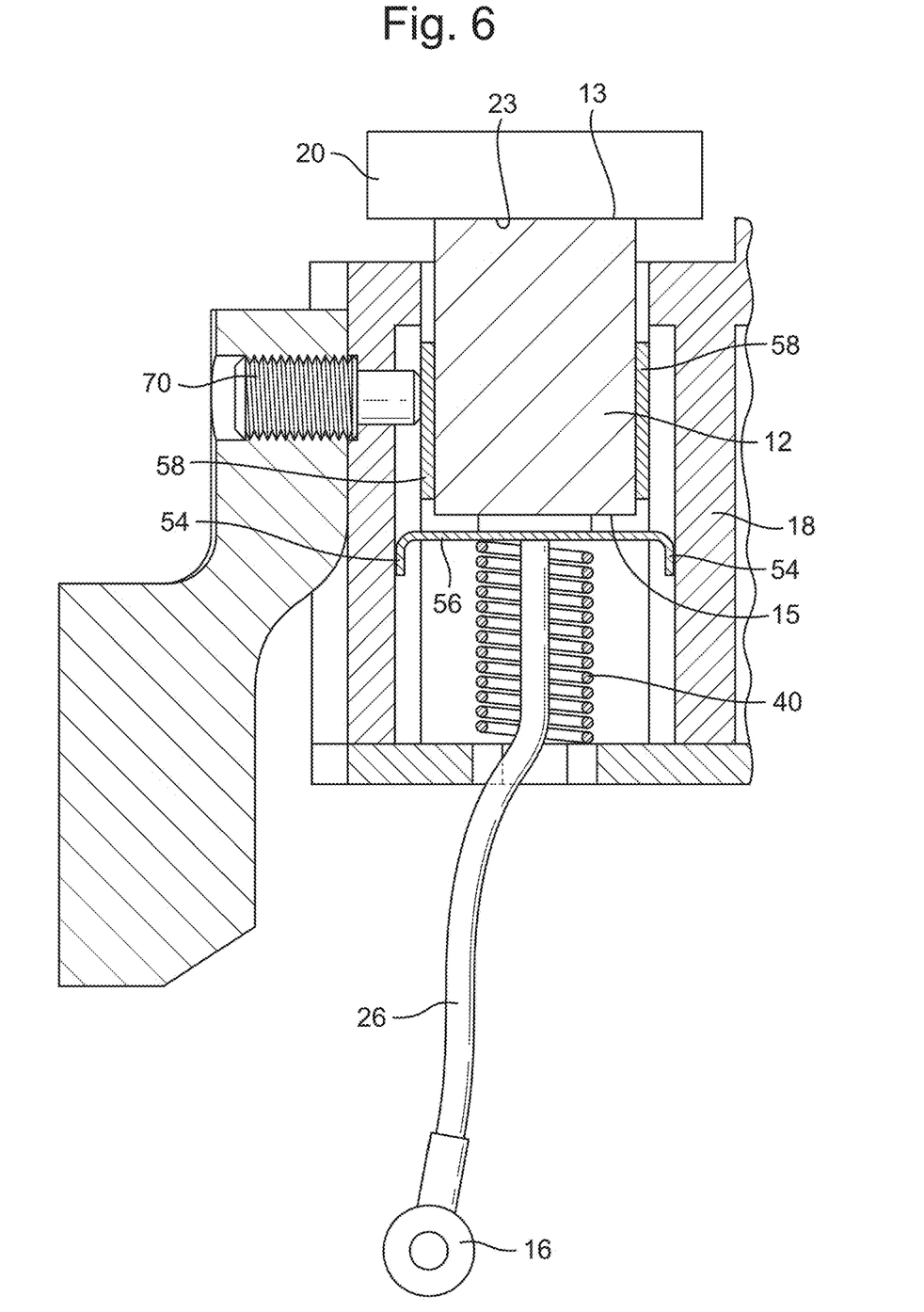
FIG. 6 shows the brush assembly immediately prior to operation.

FIG. 6 shows the brush assembly 10 immediately prior to operation, in which the brush 12 abuts an opposing slip ring 20 so as to transfer electrical current from the electrical connector 16 to the slip ring 20, via the conductor 26 and carrier 50. As shown in FIG. 4, the resilient member 40 is biased between the carrier 50 and the housing 18, and is in a highly compressed state. It will be appreciated that the upper, contact surface or face 13 of the brush 12 contacts an opposing surface 23 of the slip ring 20, such that the contact surface 13 of the brush 12 wears down in use.

Figure 7:
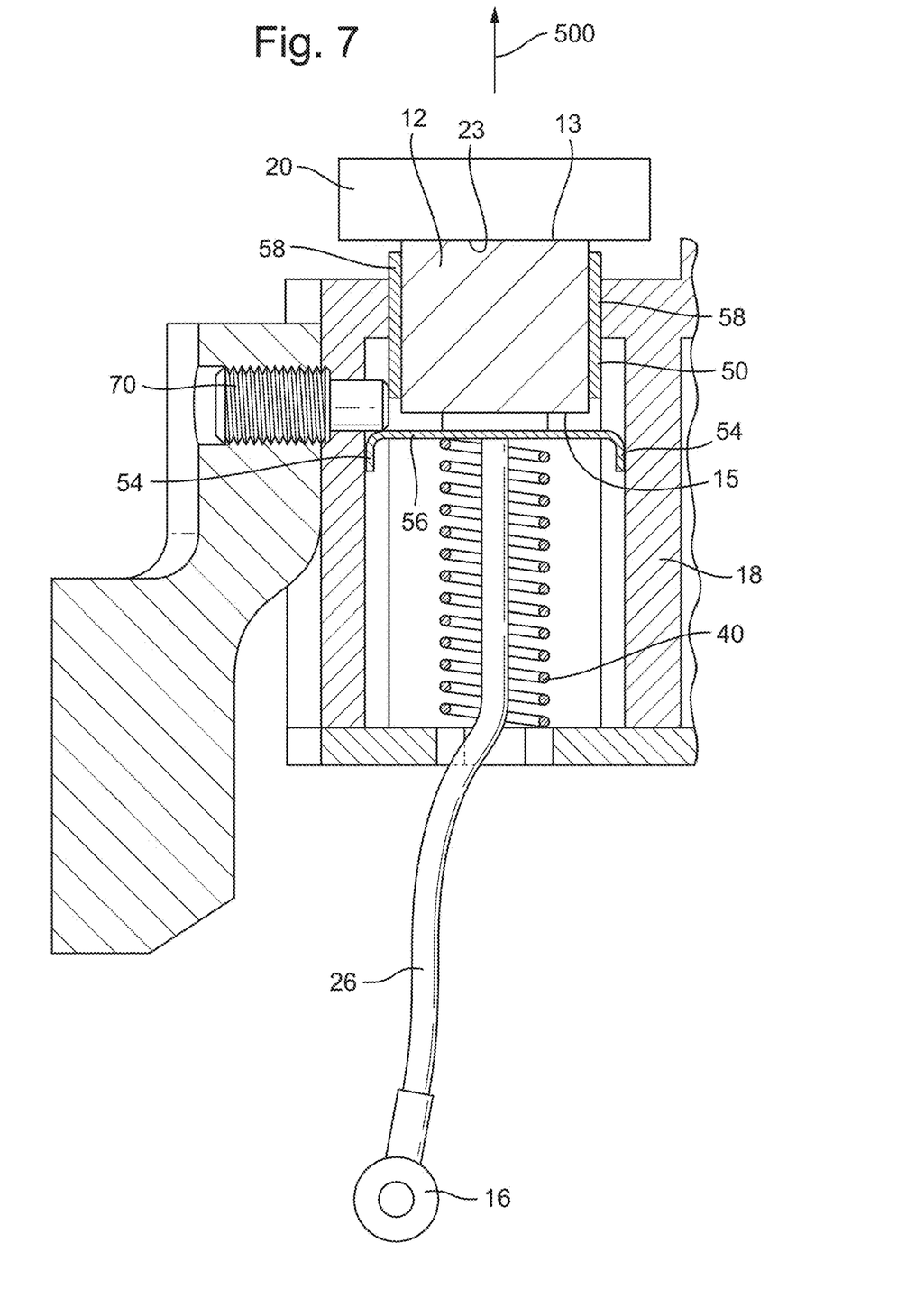
FIG. 7 shows the brush assembly after a period of operation, wherein the contact surface of the brush has worn down.

FIG. 7 shows the brush assembly 10 after a period of operation, from which it can be seen that the contact surface 13 of the brush 12 has worn down. Because of this, the resilient member 40 has decompressed to a relatively less compressed state from that shown in FIG. 6. This causes the carrier 50 to be further displaced towards the slip ring 20. As such, the opposing surface 23 of the slip ring 20 almost contacts an upper rim 54 of the carrier 50. However, as discussed above the portion of the housing 18 or (in the illustrated embodiment) the locking member 70 may be configured to prevent further movement of the carrier 50 towards the slip ring 20, and subsequent contact therebetween. The portion of the housing 18 or locking member 70 may be configured such that the carrier 50 will always be spaced apart from the slip ring 20 regardless of the wear on the brush 12. This prevents undesirable contact between the carrier 50 (which may not be abradable) and the slip ring 20.

The brush 12 shown in FIG. 7 has worn down to such an extent that it should be replaced.

Figure 8A:
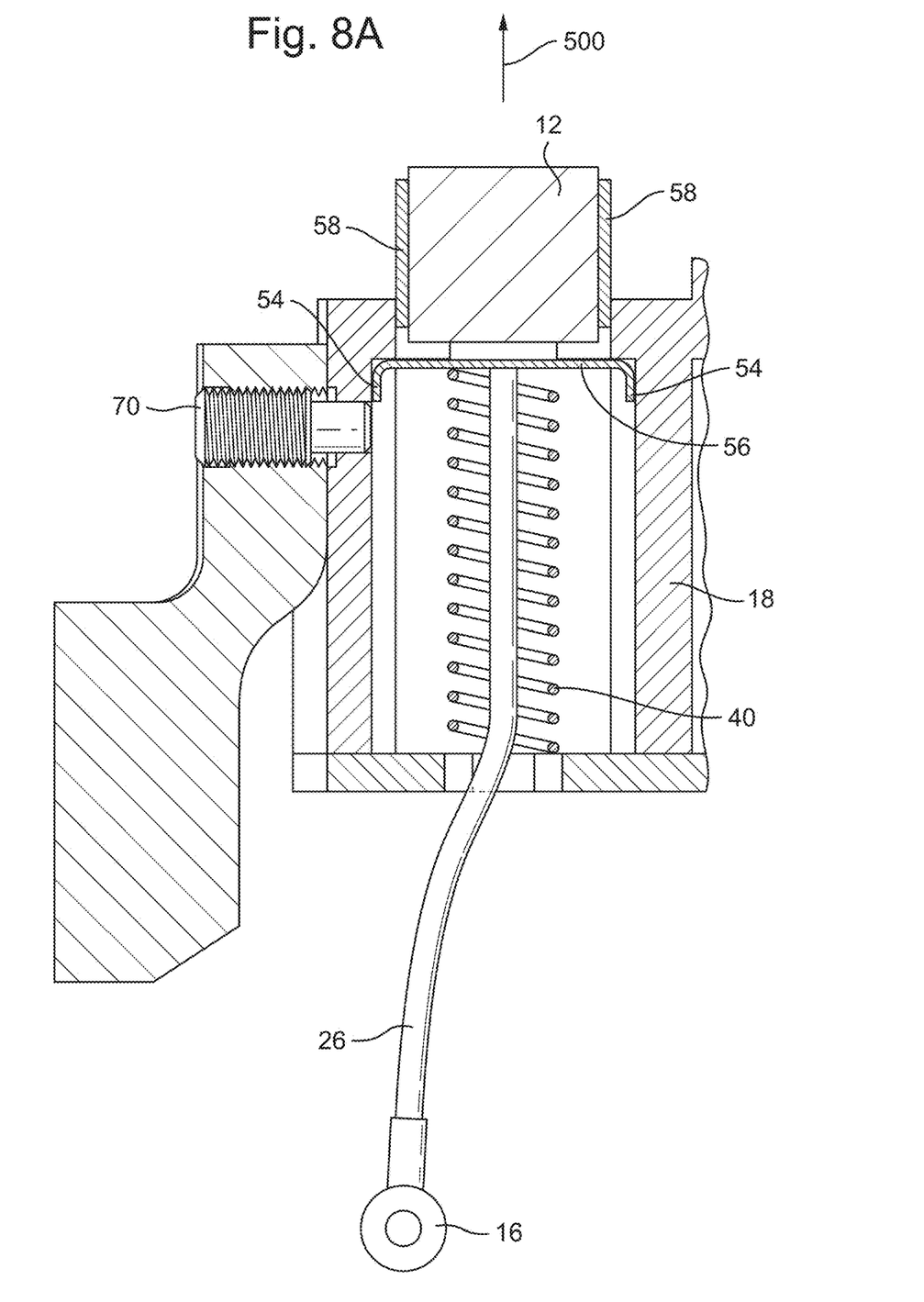
Figure 8B:
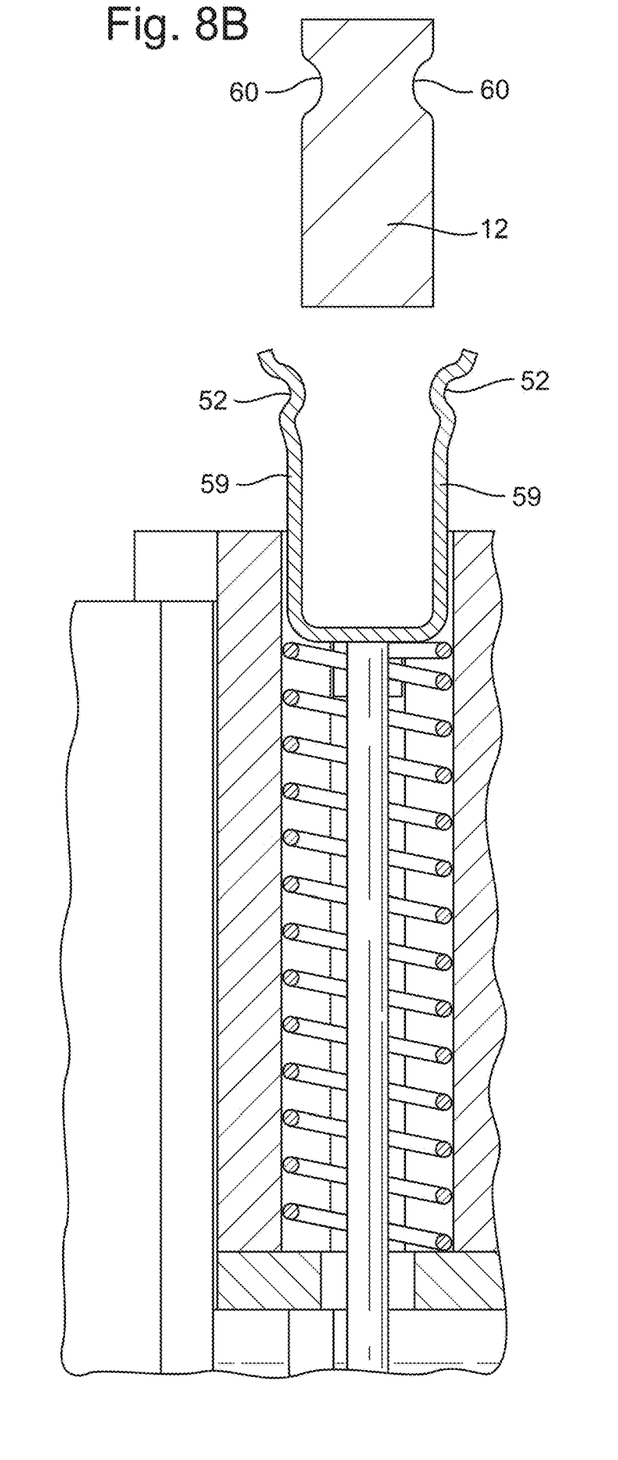
FIG. 8B shows the brush assembly with retaining arms moved to allow removal of the brush.

FIGS. 7 and 8A-B illustrates one example of how the brush 12 may be removed from the carrier 50 without substantially affecting the remainder of the apparatus 10, for example without having to disassemble other parts of the apparatus 10 or interfering with the electrical connections of the assembly 10.

Figure 5:
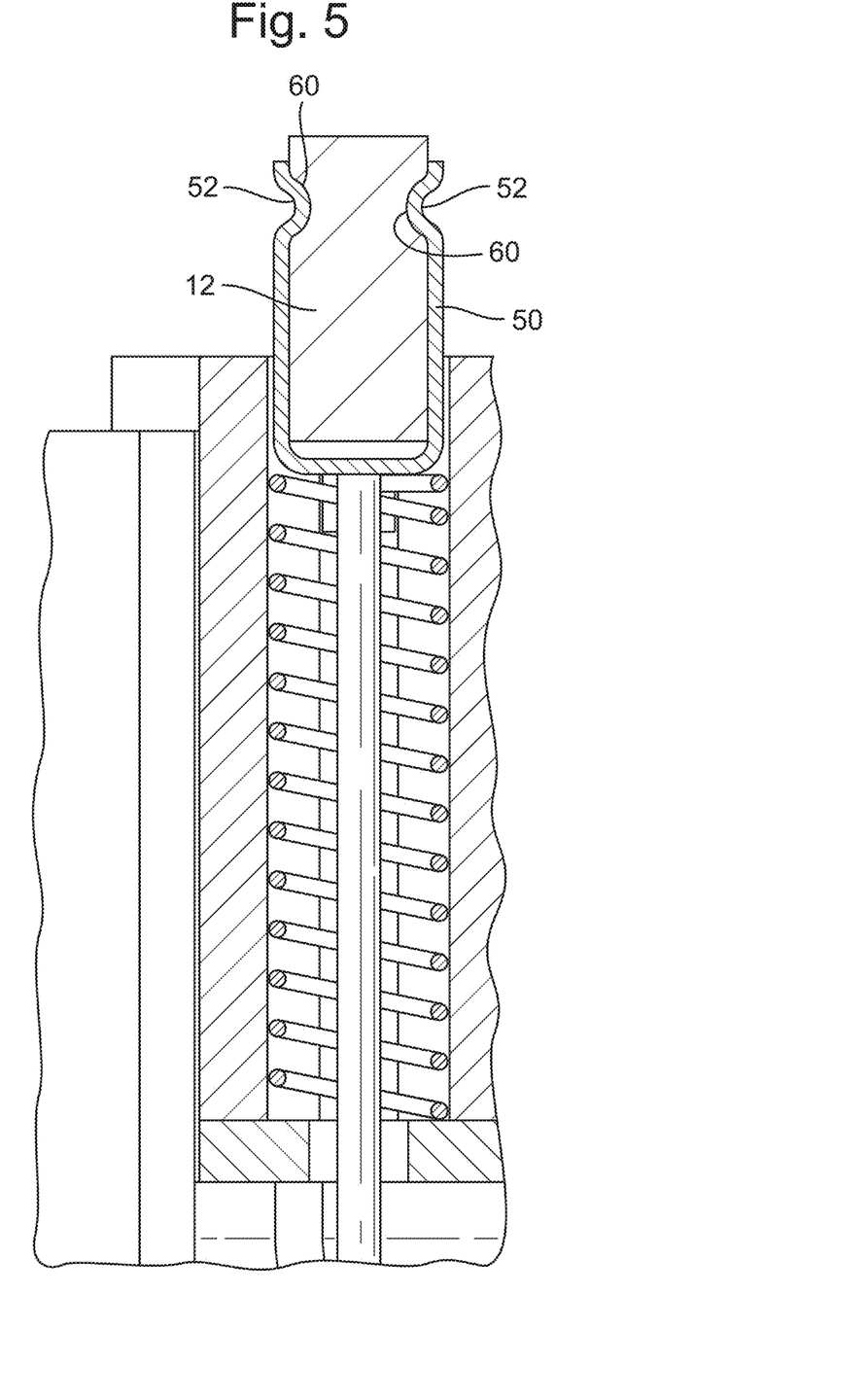
FIG. 5 is a cross-section "B" through the brush assembly as shown in FIG. 3A.

In FIG. 7 (assuming the slip ring 20 is not present) the locking member 70 prevents further movement of the carrier 50 in a direction away from the housing 18, as indicated by arrow 500. This means that the brush 12 cannot be removed from the carrier 50, since the projections 52 remain within the recesses 60 and prevent movement of the brush 12 in this direction, as shown in FIG. 5.

In order to allow further movement of the carrier 50, the locking member 70 may be displaced, as shown in FIG. 8A, which permits further movement of the carrier 50 away from the housing 18 (in the direction of arrow 500). In this position, the carrier 50 (e.g., the arms or tines 59 thereof) may be deformed, as shown in FIG. 8B, such that the projections 52 fall out of the recesses 60, which permits movement of the brush 12 out of the carrier 50 (as indicated by arrow 500) so that it can be removed therefrom.

The locking member 70 could be moved back to its original position in order to prevent movement of the carrier 50 towards the housing 18, which can assist in removal of the brush 12 since it prevents the carrier 50 moving back into the housing 18.

The carrier 50 (e.g., the arms or tines 59 thereof) may be displaced or deformed, for example due to an intrinsic nature of the material from which it is formed. For example, the carrier 50 (e.g., the arms or tines 59 thereof) may be made from a resilient and/or an elastically deformable material. In other embodiments, suitable hinges could be used that are configured to permit the aforementioned movement of the arms 58 (including the projections 52) as shown in FIG. 6C.

Figure 9:
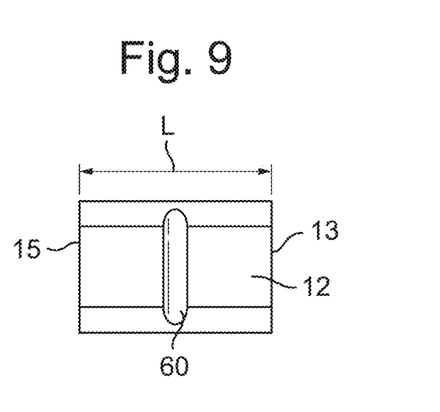
FIG. 9 shows an embodiment of a brush in isolation and prior to use.

FIG. 9 shows an embodiment of a brush 12 in isolation and prior to use. The brush 12 is shown as having a length L from its upper contact surface (which is referred to above) 13 to a lower surface 15. The recesses 60 may be located roughly halfway between the upper and lower contact surfaces 13, 15, and roughly halfway along the length L of the brush 12. As the brush 12 is symmetrical on either side of the recesses 60, instead of replacing the brush 12, it can be placed into a usable state very quickly by inverting the brush 12, so that the lower surface 15 becomes the contact surface, and the upper surface 13 becomes the surface that faces the base 56 of the carrier 50.

Figure 10A:
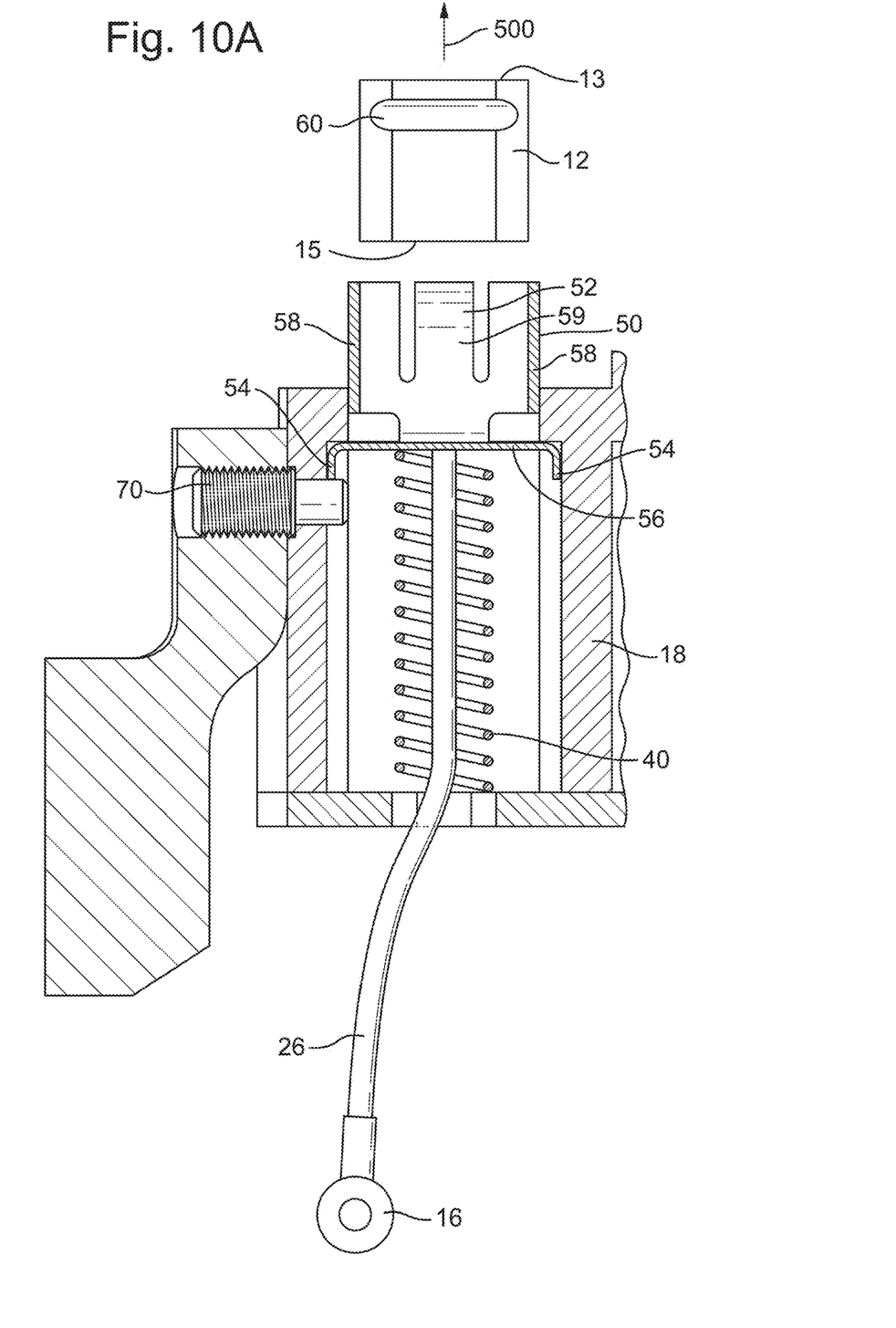
FIGS. 10A and 10B show removal of a brush and inversion to utilise both upper and lower contact surfaces thereof.
Figure 10B:
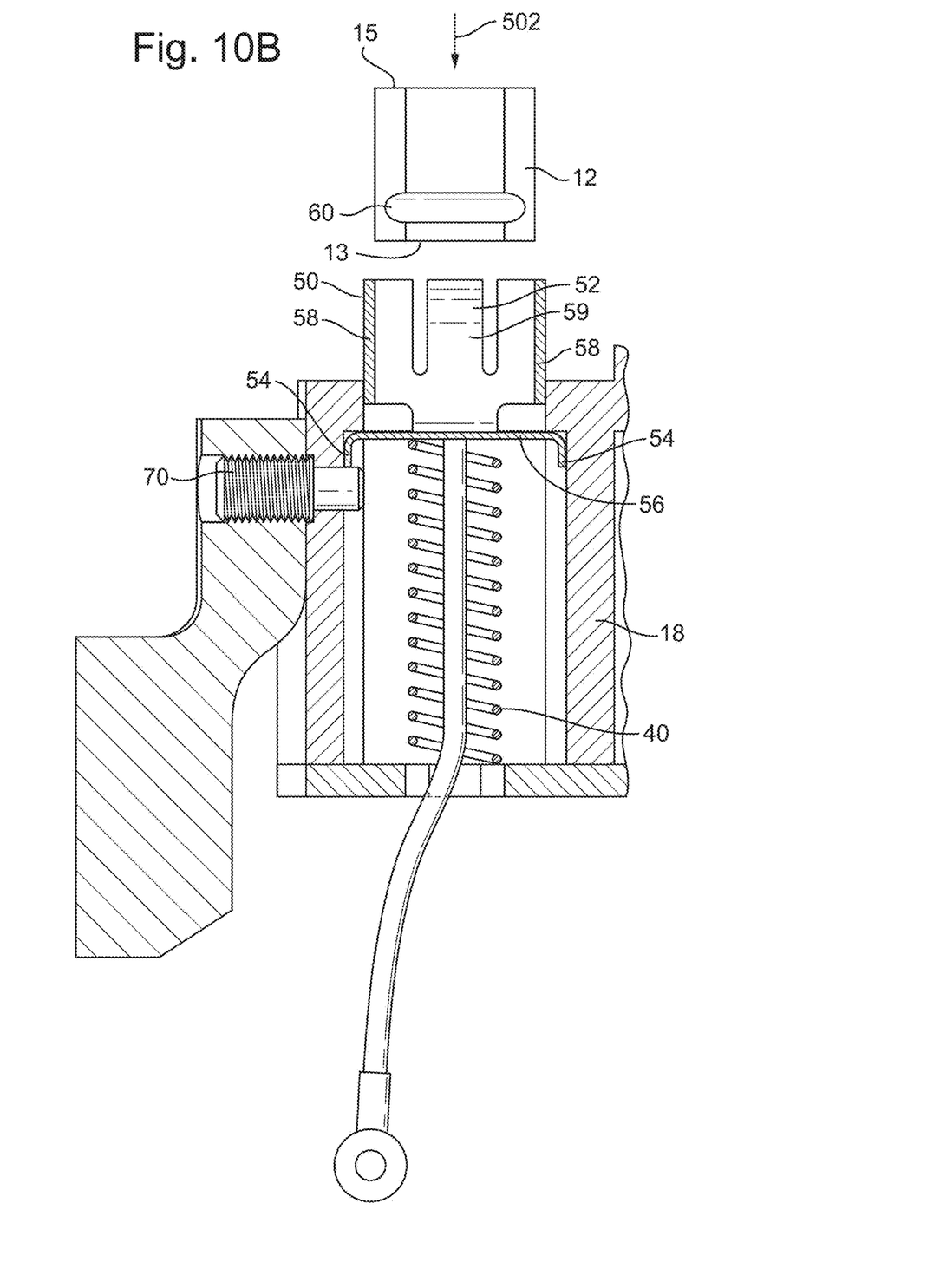

This is shown in FIGS. 10A and 10B, in which it can be seen that the brush 12 can be removed from the carrier 50 (arrow 500) while in its initial orientation, wherein the upper surface 13 forms the contact surface of the brush 12 in use. The brush 12 can then be inverted so that the previous contact surface 13 now becomes the lower surface of the brush 12 configured to face the base 56 of the carrier 50, and the previous lower surface 15 becomes the upper surface configured to contact the slip ring 20. The brush 12 can then be inserted back into the carrier 50 (FIG. 10B and arrow 502) wherein, due to the greater distance between the recesses 60 and the new upper surface 15, the brush 12 will have an additional life before it needs replacing.

Generally, the present disclosure provides replaceable brushes in the brush assembly, wherein the sliding carrier may be configured to clip onto the brushes of the brush assembly. The carrier may be electrically connected to a power system via the electrical connection. The one or more recesses on the brush may be machined into the brush material (e.g., carbon), or could be provided by a metallic insert that has been integrated into the brush during manufacture. Several methods of providing a carrier that clips onto a brush can be envisaged, some of which are described above. However, any suitable method of clipping may be used.

A further technical effect of the disclosed technology is that the side wear described in respect of FIG. 2 is reduced or eliminated, due to the protection afforded by the carrier, which may be located between the brushes (which may be abradable) and the housing. As such, instead of the brushes contacting the housing as they move in use, the carrier contacts the housing instead. Since the carrier may be made of a less abradable material it will be less prone to wear.

As described in respect of FIGS. 9-10B, the brush design could include a symmetrical shape or an additional length below the recesses (e.g., in a direction away from the initial contact surface) such that the brush can be inverted and used for a period of time after the initial wear of the initial or primary contact surface. These embodiments provide the potential for continuing operation once substantial wear of the brush has been detected, during which time a new (e.g., full-length) brush can be sourced and used to replace the worn brush. This could be useful if there are no new brushes on site, or it is desired to continue operation of the rotating component for a short period of time. The ability to quickly reverse or invert the brushes so as to continue operation, without disassembling the entire brush assembly is seen as an important effect of these embodiments. In the illustrated embodiment each of the one or more brushes is a substantially cuboid block or cylinder, with recesses that can be roughly half way along its length, wherein each brush is substantially symmetrical either side of the recess. Although shown as located half way along its length in the illustrated embodiments, this is not essential and the recess (or projection if these are swapped) could be located at any suitable point along the length of the block.

A locking member is disclosed as described above and is configured to prevent the carrier from moving into or from a position in which the brush can be removed therefrom. This can aid in a user replacing the brushes, in that it prevents the carrier from moving back into the housing during this operation. In addition, the locking member can be configured to prevent the carrier from contacting any rotating parts, such as the slip ring described above. It can do this by limiting the movement of the carrier such that there will always be a gap between the carrier and the rotating part.

The locking member can substantially avoid the brush being released, by preventing movement of the carrier out of the housing to the extent that the arms of the carrier can open to allow removal of the brush. In other words, the locking member can prevent the carrier from moving into a position in which it can be deformed and unclip from the brush.

Although the present disclosure has been described with reference to various embodiments, it will be understood by those skilled in the art that various changes in form and detail may be made without departing from the scope of the invention as set forth in the accompanying claims.

The invention claimed is:

1. A brush assembly for transmitting electrical power to a rotating component, the assembly comprising:
   one or more electrically conductive brushes;
   a housing configured to receive the one or more brushes and hold the one or more brushes in alignment with an opposing surface; and
   one or more brush carriers, each configured to receive and clip onto a respective brush such that each of the one or more brushes can be removed from its respective carrier by unclipping the carrier from the brush;
   wherein each brush carrier is configured to slide within the housing, and
   wherein each brush carrier is configured to prevent any contact between the housing and a respective brush as each brush carrier slides within the housing.

2. A brush assembly as claimed in claim 1, further comprising one or more resilient members configured to bias a respective carrier towards an opposing surface.

3. A brush assembly as claimed in claim 2, wherein each resilient member is biased between the housing and a respective carrier.

4. A brush assembly as claimed in claim 1, wherein the brushes are replaceable.

5. A brush assembly as claimed in claim 1, wherein the brushes or the carrier comprise one or more retaining devices configured to hold the brushes in place with respect to the carrier.

6. A brush assembly as claimed in claim 5, wherein the recesses are located on the brushes and machined into lateral sides thereof.

7. A brush assembly as claimed in claim 1, wherein one of the carriers and brushes comprise one or more projections, and the other of the carriers and brushes comprise one or more recesses, wherein the projections and recesses are paired with each other such that as the carrier clips onto the brush, each projection mates with a respective recess to substantially prevent movement of each brush relative to a respective carrier.

8. A brush assembly as claimed in claim 7, wherein the projections are located on the carrier and formed in arms of the carrier that clip onto lateral sides of the brushes.

9. A brush assembly as claimed in claim 7, wherein each of the one or more brushes comprises upper and lower surfaces for electrical contact with an opposing conductor, with recesses located a distance along its length between the upper and lower contact surfaces in such a manner that one of the upper or lower contact surfaces could be used as a first contact surface, then the brush inverted after a period of operation and the other of the upper or lower contact surfaces used as a second, different contact surface.

10. A brush assembly as claimed in claim 7, wherein the brush is substantially symmetrical either side of the recesses or projections.

11. A brush assembly as claimed in claim 1, further comprising
   a locking member configured to prevent movement of the carrier.

12. A brush assembly as claimed in claim 1, further comprising an indication device configured to indicate a maximum travel of the carrier, so as to indicate a maximum wear of the brush.

13. A brush assembly as claimed in claim 1, wherein each brush carrier is configured to prevent any contact between the housing and the respective brush throughout the entire range of movement of each brush carrier as each brush carrier slides within the housing.

14. A brush assembly as claimed in claim 1, wherein each brush carrier is located between the housing and the respective brush to prevent any contact between the brush and the housing as each brush carrier slides within the housing.

15. A brush assembly as claimed in claim 1, wherein each brush carrier comprises arms located between the housing and a respective brush that prevent any contact between the brush and the housing as each brush carrier slides within the housing.

16. A brush assembly as claimed in claim 1, wherein the brushes never contact the housing as they move in use, due to each brush carrier contacting the housing instead.

17. A brush assembly for transmitting electrical power to a rotating component, the assembly comprising:
   one or more electrically conductive brushes;
   a housing configured to receive the one or more brushes and hold the one or more brushes in alignment with an opposing surface;
   one or more brush carriers, each configured to receive and clip onto a respective brush such that each of the one or more brushes can be removed from its respective carrier by unclipping the carrier from the brush; and
   a locking member configured to prevent movement of the carrier;
   wherein the locking member is movable between a first position in which the locking member prevents movement of the carrier in a direction towards or away from an opposing surface, and a second position in which the locking member does not prevent movement of the carrier towards or away from an opposing surface.

18. A brush assembly for transmitting electrical power to a rotating component, the assembly comprising:
   one or more electrically conductive brushes;
   a housing configured to receive the one or more brushes and hold the one or more brushes in alignment with an opposing surface; and
   one or more brush carriers, each configured to receive and clip onto a respective brush such that each of the one or more brushes can be removed from its respective carrier by unclipping the carrier from the brush;

wherein one of the carriers and brushes comprise one or more projections, and the other of the carriers and brushes comprise one or more recesses, wherein the projections and recesses are paired with each other such that as the carrier clips onto the brush, each projection mates with a respective recess to substantially prevent movement of each brush relative to a respective carrier;

wherein each of the one or more brushes comprises upper and lower surfaces for electrical contact with an opposing conductor, with recesses located a distance along its length between the upper and lower contact surfaces in such a manner that one of the upper or lower contact surfaces could be used as a first contact surface, then the brush inverted after a period of operation and the other of the upper or lower contact surfaces used as a second, different contact surface.

* * * * *